United States Patent [19]

Martineau

[11] Patent Number: 5,302,938
[45] Date of Patent: Apr. 12, 1994

[54] SOUND GENERATING DEVICE FOR FIREARM, BOW OR THE LIKE

[76] Inventor: Mark Martineau, Rte. 1, Box 144A, Southwest City, Mo. 64863

[21] Appl. No.: 986,339

[22] Filed: Dec. 7, 1992

[51] Int. Cl.⁵ .............................................. F41C 27/00
[52] U.S. Cl. ...................................... 340/573; 42/1.01; 116/67 R
[58] Field of Search ................. 116/142 FP, 112, 70; 446/216; 42/1.01; 340/573, 393

[56] References Cited

U.S. PATENT DOCUMENTS

| | | | |
|---|---|---|---|
| 2,737,757 | 3/1956 | Liebelt . | |
| 3,044,204 | 7/1962 | Zimmerman | 42/1.01 X |
| 3,112,645 | 12/1963 | Glass | 116/214 X |
| 3,669,059 | 6/1972 | Stuart | 116/67 R |
| 3,757,731 | 9/1973 | Pappas et al. . | |
| 3,842,526 | 10/1974 | Dixon | 42/1.01 |
| 4,432,299 | 2/1984 | Smith . | |
| 4,739,569 | 4/1988 | Battle | 42/1.01 |
| 4,915,054 | 4/1990 | Vidovic et al. . | |
| 4,967,684 | 11/1990 | Vidovic et al. . | |
| 5,016,378 | 5/1991 | Sain | 42/1.01 X |
| 5,183,951 | 2/1993 | Bilodeau | 42/1.10 |

*Primary Examiner*—Daniel M. Yasich
*Attorney, Agent, or Firm*—Head & Johnson

[57] ABSTRACT

A sound generating device for a firearm, bow or the like which is hand-held by a hunter. A mounting mechanism is provided to attach or mount the sound generating device to the firearm, bow or the like. A noise generator produces a sound which is audible to an animal. The noise generator may be activated with one of the hunter's hands while holding the firearm, bow or the like, in order to cause the animal to pause in response to the audible sound.

10 Claims, 2 Drawing Sheets

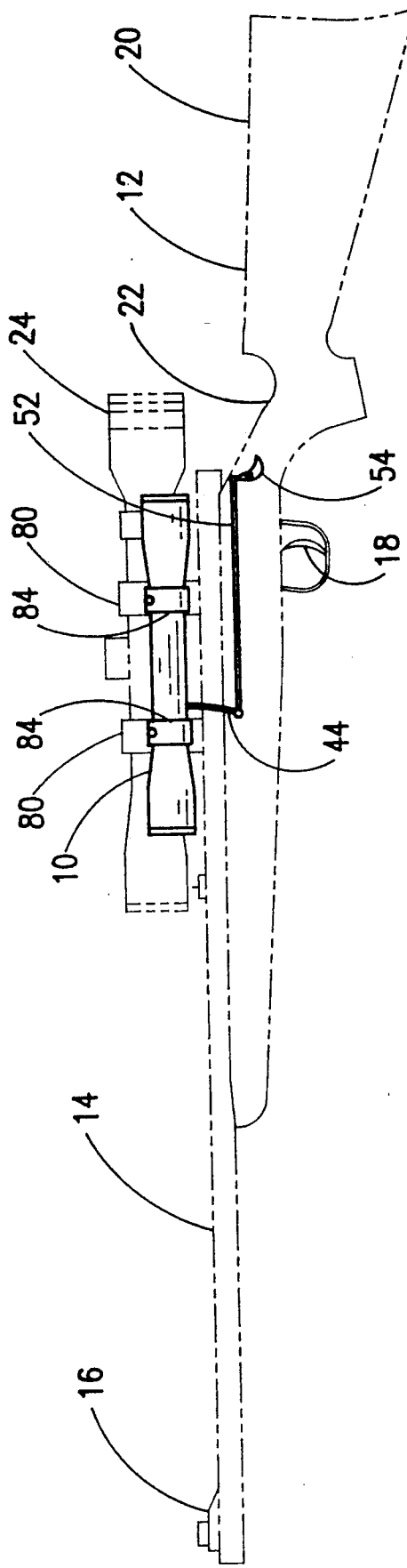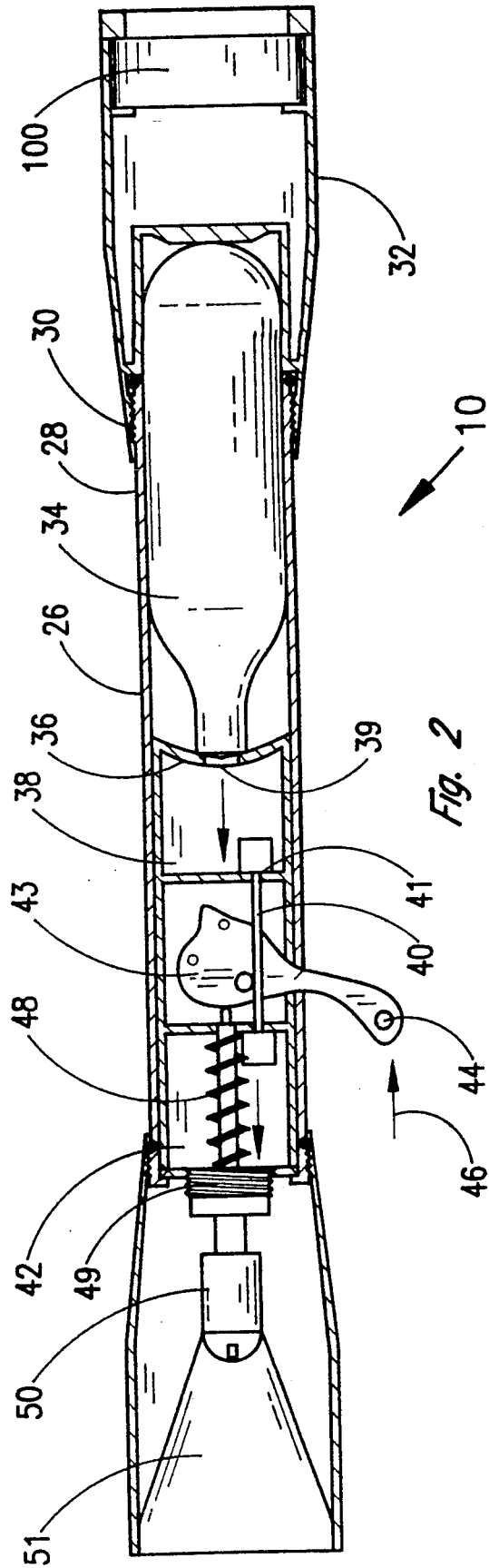

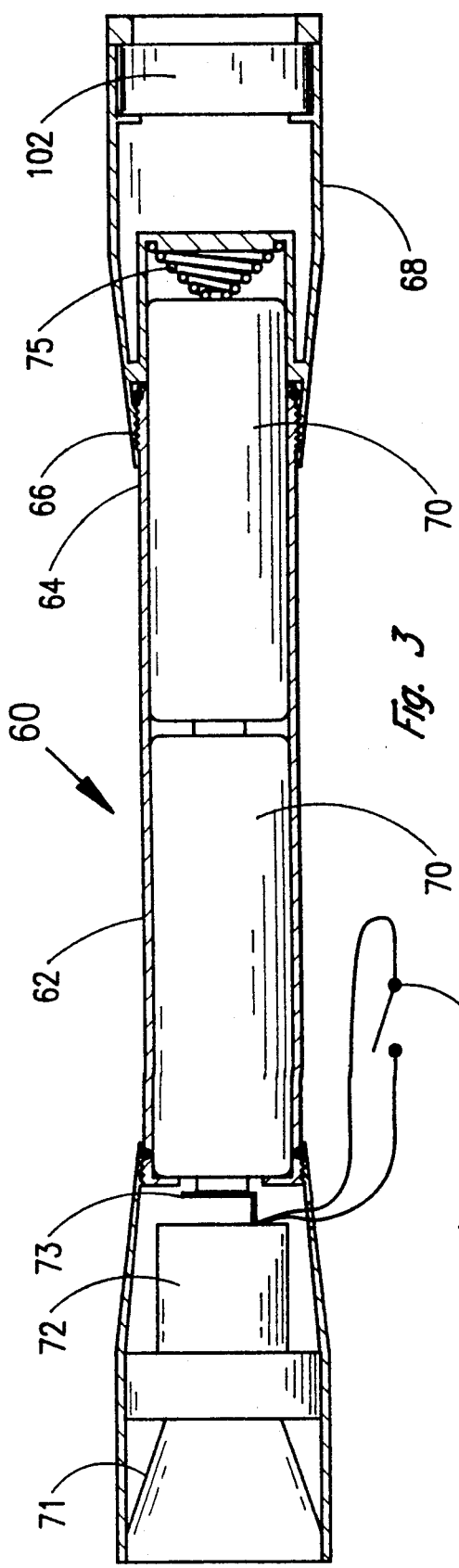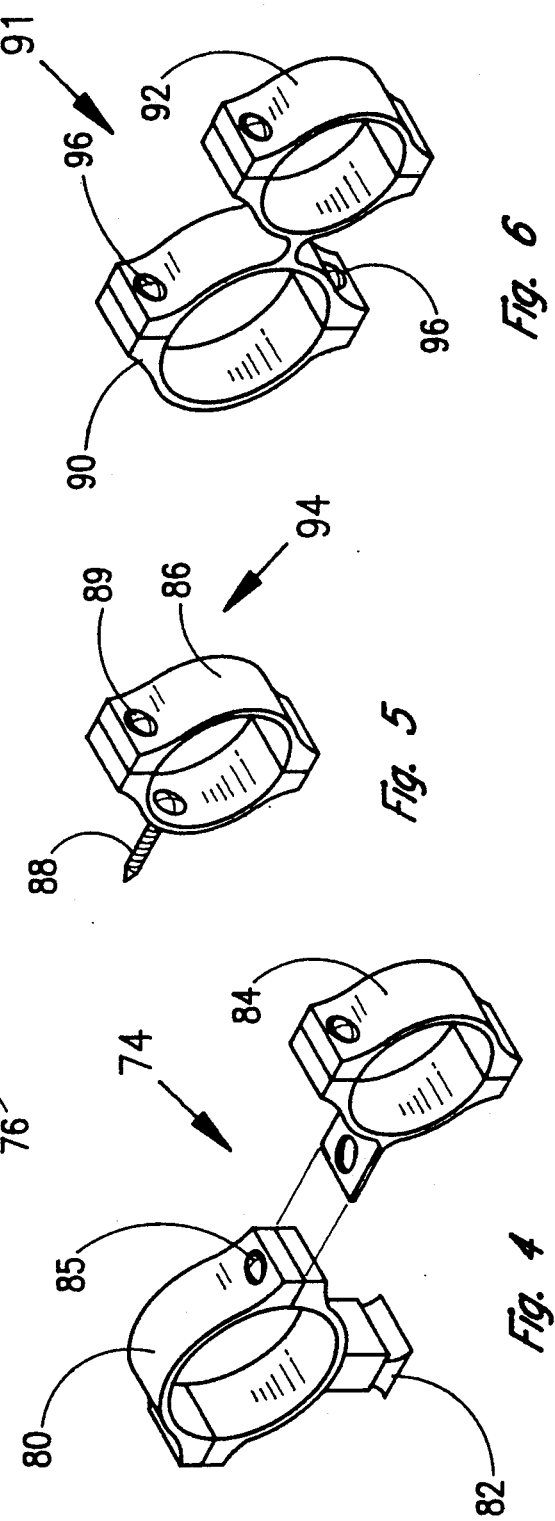

SOUND GENERATING DEVICE FOR FIREARM, BOW OR THE LIKE

BACKGROUND OF THE INVENTION

1. Field of the Invention

The present invention is directed to a sound generating device to be used with and attached to a hand-held firearm, bow or the like which may be activated by a hunter to cause an animal to pause in response to the sound.

2. Prior Art

It is well known that wild animals will respond with curiosity to an unfamiliar sound such as a whistle, buzzer or the like. For this reason, hunters will often carry a whistle or buzzer when in the field.

When a hunter comes upon an animal, he or she can blow the whistle or activate the buzzer. The animal will stop momentarily and pause before fleeing in order to listen to the sound. This gives the hunter a few valuable seconds in which to aim and shoot at a stationary target.

Shooting at a stationary target may also have the effect of reducing the number of wounded animals not able to be retrieved by hunters.

The problem with standard whistles is that they must be brought up to the mouth and blown before the sound is produced. Likewise, a buzzer or horn must be manipulated and activated before the sound is produced. This requires the use of one or both hands. During this process, the firearm can't be operated. In addition to the fact that the hunter's hand or hands are preoccupied, the hunter will be required to divert his or her gaze from the animal.

After the whistle or buzzer has been sounded, the rifle or bow may again be raised with the barrel held in one hand and the action mechanism in the other. The sight or scope may be used to target the animal and, finally, a shot taken. These procedures consume a significant amount of time; the hunted animal will likely flee before then.

Additionally, a loaded gun must always be operated safely; its operation can only be hurried to a certain degree.

There exists a need for a sound generating device that may be operated in conjunction with a firearm, bow or the like, so that the hunter can proceed with the shot while operating the sound producing device.

Accordingly, it is a principal object and purpose of the present invention to provide a sound generating device that may be operated in conjunction with a firearm, bow or the like.

It is a further object and purpose of the present invention to provide a sound generating device that is mounted on and attached to a firearm, bow or the like.

It is a further object and purpose of the present invention to provide a sound generating device mounted on a firearm, bow or the like that may be operated without interfering with the operation of the firearm, bow or the like.

It is an additional object and purpose of the present invention to provide a sound generating device that may be operated at the same time as a firearm, bow or the like without taking the hunter's finger off the trigger mechanism.

SUMMARY OF THE INVENTION

The present invention provides a sound generating device which may be mounted on and attached to a hand-held firearm such as a rifle, bow, cross-bow or the like which is used by hunters.

In one embodiment, the sound generating device is mounted on a rifle which includes a barrel, a sight, an action mechanism including a trigger, and a stock. Between the end of the stock and the trigger is a hand grip.

The sound generating device includes a substantially cylindrical elongated housing having an open end with external threads thereon. The external threads mate with a threaded end cap which closes off and seals the open end. The open end of the housing is constructed to receive a pressurized $CO_2$ gas container cartridge within the housing.

The housing includes a piercing assembly having a protruding member which forces a valve in the pressurized gas container open and allows pressurized gas to move into a piercing assembly chamber.

Pressurized gas flows from the piercing assembly chamber through an internal tube into an air release valve chamber within the housing.

A pivoting trigger mechanism includes a trigger which extends outward externally from the housing. Movement of the trigger causes a piston within the housing to move longitudinally within the housing in order to open a valve to allow pressurized gas to flow out of the air release valve chamber and through a whistle. As the pressurized gas flows through the whistle an audible sound is created.

In an alternate embodiment of the sound generating device, an elongated, cylindrical housing has an open end which receives a battery or batteries acting as a voltage supply.

The batteries of the voltage supply are wired to a sound generating mechanism such as a piezo electric buzzer through a contact which thereby produces an audible sound.

The voltage to the buzzer may pass through a switch. In the open position, the buzzer is not activated. When the switch is closed, the voltage will pass through the buzzer and a sound produced. In one embodiment, the switch will be a spring-loaded button located near the hand grip of the rifle.

Various arrangements to mount either embodiment of the sound generating device to the firearm, bow or the like may be made. A housing clamp may be secured to and extend from an existing scope clamp attached to the rifle. In an alternate arrangement, a housing clamp will surround the body of the sound generating device and be secured to the stock of the rifle by a screw or other fastener.

A further mounting arrangement employs a scope clamp which surrounds the existing scope on the rifle. Extending radially from the scope clamp is a housing clamp which would surround and secure the housing of the sound generating device. In each instance, the sound generating device would be easily mounted to the firearm, bow or the like and not interfere with the operation of the firearm, bow or the like.

With the sound generating device as described and mounted herein, a hunter can activate the sound generating device without interrupting his or her focus on the target and without taking his or her finger off the trigger mechanism.

BRIEF DESCRIPTION OF THE DRAWINGS

FIG. 1 is a perspective view of a sound generating device constructed in accordance with the present invention which is mounted on and attached to a rifle;

FIG. 2 is a sectional view of a sound generating device as shown in FIG. 1 a part from the rifle;

FIG. 3 is a sectional view of an alternate embodiment of a sound generating device;

FIG. 4 is a clamp arrangement to mount the sound generating device to an existing clamp for a scope;

FIG. 5 is a perspective view of a clamp to mount the sound generating device directly to a rifle; and FIG. 6 is a perspective view of an alternate clamp arrangement to connect the sound generating device to a scope.

DETAILED DESCRIPTION OF THE PREFERRED EMBODIMENT

Referring to the drawings in detail, FIG. 1 is a perspective view of a sound generating device 10 which is shown mounted on and attached to a rifle 12 (shown by dashed lines).

While the present embodiment may be described in relation to a rifle 12, it will be understood that the sound generating device 10 of the present invention may be used with any hand-held firearm, bow, cross-bow or the like which are used by hunters.

The rifle 12, which is well known, includes a barrel 14, a sight 16, action mechanism including a trigger 18 and a stock 20. Between the end of the stock and the trigger is a hand grip 22. As seen in FIG. 1, the rifle 12 also includes an optional scope 24, through which the hunter views the targeted game.

The sound generating device 10 will be mounted to and attached directly to the rifle 12 or, alternatively, the sound generating device 10 will be attached to and mounted to the scope 24 which is, in turn, connected to the rifle 12.

The sound generating device is elongated and is substantially parallel to the rifle and the scope. It will not interfere with the hunter's holding or operation of the rifle.

FIG. 2 shows a sectional view of a sound generating device 10 which produces a sound through a whistle mechanism. The sound generating device 10 includes an elongated housing 26 which is substantially cylindrical. The housing 26 has an open end 28 with external threads 30 thereon. The external threads 30 mate with a threaded end cap 32 which closes off and seals the open end 28.

The open end is hollow, having a cylindrical internal configuration. The open end 28 of the housing 26 is constructed to receive a pressurized gas container, such as a tubular $CO_2$ cartridge 34, within the housing.

The housing 26 includes an internal piercing assembly 36 having a protruding member (not visible in FIG. 2) which mates with a valve (not shown) within the pressurized gas container 34. As the end cap 32 is screwed onto the housing 26, the pressurized gas container 34 will be urged axially into the housing toward the protruding member of the piercing assembly 36. A piercing assembly chamber 38 is substantially closed but has an opening 39 at the piercing assembly. When the end cap is screwed onto the housing, the pressurized gas container valve will be forced open and allow gas to move into the piercing assembly chamber 38 so that the piercing assembly chamber is also pressurized.

Pressurized gas would then flow from the piercing assembly chamber 38 through an opening 41 and through an internal tube 40 into an air release valve chamber 42 within the housing. Accordingly, once the pressurized gas container 34 is installed and the end cap threaded onto the housing the piercing assembly chamber and the air release valve chamber will be pressurized with gas.

A pivoting trigger mechanism 43 includes a trigger 44 which extends outward externally from the housing 26. The trigger 44 will be capable of moving from a position at rest as shown in FIG. 2. The trigger may be moved in the direction of the arrow 46. Movement of the trigger 44 will move a piston 48 axially or longitudinally within the housing. Movement of the piston 48 by the trigger will open a valve 49 to allow pressurized gas to flow out of the air release valve chamber 42 and through a whistle 50. The piston 48 is surrounded by a spring so that it will be returned to the closed position.

As the pressurized gas flows through the whistle, an audible sound is created. The device 10 may include a flared or funnel end 51 in order to direct the sound emitted by the whistle.

The whistle may be removable and replaceable so that a choice of tones are allowed. A whistle 50 might also be chosen that is audible to certain animals but not to humans.

Returning to a consideration of FIG. 1, the trigger may be moved and activated by a rod 52 connected to a pivoting thumb switch 54 secured to the stock at or near the hand grip. Accordingly, the hunter could depress the thumb switch 54 while a hand surrounds the hand grip.

FIG. 3 shows an alternate embodiment of the sound generating device 60 for use with a hand-held firearm, bow or the like. The sound generating device 60 includes an elongated housing 62 which is substantially cylindrical. The housing 62 has an open end 64 with external threads 66 located at the open end. An end cap 68 having internal threads may be threadably received on the open end 64 in order to close the housing. The housing 62 is substantially hollow and tubular in order to receive a battery or batteries 70 which act as a voltage supply.

The batteries 70 of the voltage supply are wired to a sound generating mechanism such as a piezo electric buzzer 72 through a positive contact 73 and a negative contact 75. The piezo electric buzzer is well known and utilizes a crystal, vibrated by voltage, to produce a sound or noise. The pitch of the sound is determined by the frequency or the number of vibrations per second. As an example, a piezo electric buzzer 72 may be used resonating at a frequency of 3600 Hz plus or minus 500 Hz producing a sound level at 85dB at 12VDC.

The device 60 may include a flared or funnel end 71 to direct the sound emitted from the buzzer.

The voltage to the buzzer 72 may pass through a switch 76 (illustrated diagrammatically). In the open position, as shown in FIG. 3, the buzzer 72 is not activated. When the switch is closed, the voltage will pass through the buzzer and a sound produced. The switch to activate the noise generator may take several forms. It may take the form of a thumbswitch such as described in FIG. 1.

Alternatively, the activating mechanism may take the form of a spring-loaded button (not seen). A preferable arrangement would be for the button to be located near the hand grip 22 of the rifle. The button could, thus, be depressed by the thumb while the fingers operated the trigger.

It will be recognized that other types of horns or buzzers might be employed.

FIGS. 4, 5 and 6 show alternate arrangements to mount either embodiment of the sound generating device to a rifle 12.

FIG. 4 provides a mounting mechanism 74 having a pair of clamps for attachment to a rifle having a scope. Scope clamp 80 surrounds and holds the scope 24 to the rifle 12 through a bracket 82. Housing clamp 84 extends radially from and is secured to the scope clamp 80. In a preferred embodiment, a pair of mounting mechanisms 74 secure the housing to the scope 24.

FIG. 5 is a mounting mechanism 94 where no scope is involved. Housing clamp 86 will surround the housing 26 of the sound generating device. The housing clamp 86 will be secured to the rifle stock 20, by a screw 88 or other fastener. The clamp 86 may be composed of a pair of sections held together by screw 89 or other fasteners.

FIG. 6 shows an alternate mounting mechanism 91. Scope clamp 90 would surround the existing scope 24. Scope clamp 90 may be composed of a pair of sections held together by screws 96 or other fasteners. Extending radially outward from the scope clamp 90 is a housing clamp 92 which would surround the housing of the sound generating device.

In each instance, the sound generating device 10 or 60 would be aligned with and substantially parallel to the scope or sight. The sound generating device would be easily mounted yet not be in the way of the operation of the rifle. The hunter's hands are free to hold the rifle in the normal manner. The hunter is free to view the game through the scope.

While the foregoing mounting arrangements are illustrative, it will be recognized that other means of mounting the sound generating device to the rifle or bow are possible.

With a sound generating device as described and mounted herein, a hunter can activate the device without interrupting his or her focus on the target animal and without taking his or her finger off the trigger.

An option for each embodiment would be a timer/clock mechanism. As seen in FIG. 2, a timer/clock 100 might be located in the end cap 32 so as to be readily visible to the hunter. The timer/clock might have a source of voltage such as a miniature battery. Not only would the time of day be displayed, but the timer could also be used. If an animal is shot but not downed, it is known that it is advisable to wait a few minutes (2-3) before tracking the animal. The hunter could initiate the timer after the shot was taken in order to wait before tracking the animal. A timer/clock 102 is also seen in the sound generating device 60 in FIG. 3. A further option that might accompany the timer/clock mechanism 100 or 102 would be a thermometer having a temperature sensor and a readout to indicate the ambient air temperature.

Whereas the present invention has been described in relation to the drawings attached hereto, it should be understood that other and further modifications, apart from those shown or suggested herein, may be made within the spirit and scope of this invention.

I claim:

1. A sound generating device for a firearm, bow or the like hand-held by the hunter, which said sound generating device comprises:
    mounting means to mount a housing to said firearm, bow or the like;
    noise generating means within said housing to produce a sound audible to an animal; and
    switch means mounted on said firearm to activate said noise generating means with at least one of said hunter's hands while holding said firearm, bow or the like, said switch means normally in a deactivated position so that said noise generating means may be selectively activated in order to cause said animal to pause in response to said audible sound.

2. A sound generating device as set forth in claim 1 wherein said mounting means includes a bracket attached to a rifle.

3. A sound generating device as set forth in claim 1 wherein said mounting means includes clamp means to attach said housing to a scope on a rifle.

4. A sound generating device as set forth in claim 1 wherein said noise generating means include pressurized gas stored in a pressurized gas container, a whistle member mounted in said housing and means to direct said pressurized gas from said container through said whistle member.

5. A sound generating device as set forth in claim 4 wherein said switch means to activate said noise generating means includes a noise generating trigger which is operably engaged with a valve to allow said pressurized gas to flow through said whistle member while said noise generating trigger is engaged.

6. A sound generating device as set forth in claim 5 wherein said firearm is a rifle and wherein said noise generating trigger is located on the hand grip of said rifle so that it may be activated by a finger of the trigger hand.

7. A sound generating device as set forth in claim 1 wherein said noise generating means includes an electronic buzzer connected and wired to a voltage power source.

8. A sound generating device as set forth in claim 7 wherein said switch means to activate said noise generating means includes a button switch.

9. A sound generating device as set forth in claim 1 wherein said switch means to activate said noise generating means includes a button switch located near said gun trigger.

10. A sound generating device for a firearm, bow or the like hand-held by a hunter, which said sound generating device comprises:
    mounting means to mount a housing to said firearm, bow or the like;
    a sound generator to cause an animal to pause in response to a sound audible to said animal; and
    switch means mounted on said firearm to activate said sound generator, said switch means normally in a deactivated position and being selectively activated with at least one of said hunter's hands while holding said firearm, bow or the like.

* * * * *